(12) United States Patent
Arnault et al.

(10) Patent No.: US 11,306,808 B2
(45) Date of Patent: Apr. 19, 2022

(54) PULLEY DEVICE, IN PARTICULAR FOR TENSIONING IDLER OR RUNNER ROLLER

(71) Applicant: AKTIEBOLAGET SKF, Gothenburg (SE)

(72) Inventors: Benoit Arnault, Saint-Cyr-sur-Loire (FR); Mickael Chollet, Joué-lès-Tours (FR); Benoît Hauvespre, Saint Etienne de Chigny (FR); Nicolas Tronquoy, Fondettes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 177 days.

(21) Appl. No.: 16/752,872

(22) Filed: Jan. 27, 2020

(65) Prior Publication Data
US 2020/0263776 A1   Aug. 20, 2020

(30) Foreign Application Priority Data

Feb. 18, 2019   (DE) .......................... 102019202140.9

(51) Int. Cl.
*F16H 55/46* (2006.01)
*F16H 7/18* (2006.01)
(Continued)

(52) U.S. Cl.
CPC ........... *F16H 55/46* (2013.01); *F16H 7/1254* (2013.01); *F16H 7/18* (2013.01); *F16H 2007/0865* (2013.01)

(58) Field of Classification Search
CPC .......... F16H 55/36; F16H 55/42; F16H 55/44; F16H 55/46; F16H 55/48; F16H 55/52;
(Continued)

(56) References Cited

U.S. PATENT DOCUMENTS

| 859,099 A | * | 7/1907 | Nice ............... F16H 2007/0865 |
| | | | 474/199 |
| 3,490,285 A | * | 1/1970 | Donath ..................... F16H 7/12 |
| | | | 474/187 |

(Continued)

FOREIGN PATENT DOCUMENTS

| DE | 202005011230 U1 | 9/2005 |
| GB | 190509598 A | 5/1906 |

(Continued)

*Primary Examiner* — Michael R Mansen
*Assistant Examiner* — Raveen J Dias
(74) *Attorney, Agent, or Firm* — J-Tek Law PLLC; Scott T. Wakeman; Mark A. Ussai

(57) ABSTRACT

A pulley device configured to support a belt of a chain tensioning idler or a runner roller includes a bearing having inner and outer rings and a pulley having at least one C-shaped pulley part mounted on the bearing outer ring with an inner cylindrical portion of the pulley part press-fitted on the bearing outer ring, the bearing outer ring having a material projection and the inner cylindrical portion of the pulley part having an axial groove configured to allow the material projection to slide axially through the groove when the pulley part is slid axially onto the outer ring, the material projection forming an axial stop for the pulley part when the pulley part is rotated relative to the bearing outer ring.

10 Claims, 5 Drawing Sheets

(51) Int. Cl.
*F16H 7/12* (2006.01)
*F16H 7/08* (2006.01)

(58) Field of Classification Search
CPC .......... F16H 55/56; F16H 55/566; F16H 7/12; F16H 7/14; F16H 7/16; F16H 7/18; F16H 7/1254; F16H 2007/185; F16H 2007/0865
USPC .................................................. 474/198, 199
See application file for complete search history.

(56) References Cited

U.S. PATENT DOCUMENTS

| | | | | |
|---|---|---|---|---|
| 3,771,843 A * | 11/1973 | Clasper | .................. | B62D 55/14 474/187 |
| 3,822,457 A * | 7/1974 | Frost | ....................... | F16H 55/44 29/892.11 |
| 3,842,475 A * | 10/1974 | Clasper | .................. | B21D 53/26 29/892.11 |
| 3,915,511 A * | 10/1975 | Clasper | ..................... | B60B 3/08 474/187 |
| 3,926,485 A * | 12/1975 | Frost | ................... | F16C 33/7886 384/510 |
| 4,443,210 A * | 4/1984 | Olschewski | .......... | F16H 7/1281 474/112 |
| 4,457,740 A * | 7/1984 | Olschewski | .......... | F16C 13/006 474/112 |
| 4,468,210 A * | 8/1984 | McCutchan, Jr. | ...... | F16H 55/44 474/170 |
| 4,571,226 A * | 2/1986 | Molloy | ..................... | F16H 7/12 474/190 |
| 4,591,352 A * | 5/1986 | Olschewski | .......... | F16C 13/006 384/505 |
| 4,602,875 A * | 7/1986 | Doerr | ....................... | F16H 55/48 384/547 |
| 4,799,909 A * | 1/1989 | Kanemitsu | ........... | B21D 53/261 474/168 |
| 4,822,111 A * | 4/1989 | Albert | ..................... | B60B 3/002 301/105.1 |
| 4,831,705 A * | 5/1989 | Kanemitsu | ........... | B21D 53/261 29/892.11 |
| 5,725,448 A * | 3/1998 | Kato | ....................... | F16C 13/006 384/510 |
| 5,931,755 A * | 8/1999 | Mailey | ..................... | B29C 45/27 474/161 |
| 6,270,001 B1 * | 8/2001 | Tadic | ....................... | B23K 31/02 228/245 |
| 2003/0008741 A1 * | 1/2003 | Fadler | ...................... | F16H 55/44 474/174 |
| 2004/0178398 A1 * | 9/2004 | Miller | ...................... | F16H 55/44 254/390 |
| 2004/0235599 A1 * | 11/2004 | Ozorak | .................... | F16C 25/08 474/199 |
| 2004/0264824 A1 * | 12/2004 | Iwata | .................. | F16C 33/7853 384/484 |
| 2006/0142102 A1 * | 6/2006 | Radocaj | .................. | F16H 55/36 474/199 |
| 2008/0300077 A1 * | 12/2008 | Kapfer | .................. | F16C 13/006 474/133 |
| 2009/0191999 A1 * | 7/2009 | Joseph | .................... | F16H 55/36 474/199 |
| 2014/0031157 A1 * | 1/2014 | Takano | .................. | F16C 35/063 474/135 |
| 2016/0017978 A1 * | 1/2016 | Koda | ....................... | F16H 55/44 474/166 |
| 2016/0245389 A1 * | 8/2016 | Albrecht | ................. | F16H 55/36 |
| 2017/0023119 A1 * | 1/2017 | Lannutti | ............. | F16C 35/067 |
| 2018/0023679 A1 * | 1/2018 | Basile | ..................... | F16C 35/067 474/166 |
| 2019/0186612 A1 * | 6/2019 | Arnault | ..................... | F16H 7/12 |
| 2019/0323594 A1 * | 10/2019 | Arnault | .................... | F16C 19/18 |
| 2019/0390756 A1 * | 12/2019 | Arnault | ................. | F16H 57/0031 |
| 2020/0088274 A1 * | 3/2020 | Arnault | ................. | F16C 33/783 |
| 2020/0200221 A1 * | 6/2020 | Inoue | ...................... | F16C 33/78 |
| 2020/0256378 A1 * | 8/2020 | Hauvespre | ................ | F16H 7/20 |
| 2020/0256447 A1 * | 8/2020 | Arnault | ..................... | F16C 19/08 |
| 2020/0256448 A1 * | 8/2020 | Chollet | ................... | F16H 55/46 |
| 2020/0256449 A1 * | 8/2020 | Hauvespre | ............ | F16C 33/586 |
| 2020/0263766 A1 * | 8/2020 | Arnault | ................... | F16H 55/44 |
| 2020/0263777 A1 * | 8/2020 | Arnault | .................. | F16H 7/1254 |
| 2020/0386304 A1 * | 12/2020 | Arnault | ................. | F16H 55/36 |
| 2020/0393032 A1 * | 12/2020 | Kerin | .................... | F16H 55/36 |

FOREIGN PATENT DOCUMENTS

| | | | |
|---|---|---|---|
| GB | 141829 A | 4/1920 | |
| WO | WO-2006092187 A1 * | 9/2006 | ............ F16C 13/006 |
| WO | WO-2007101771 A1 * | 9/2007 | ............. F16H 55/44 |

* cited by examiner

A

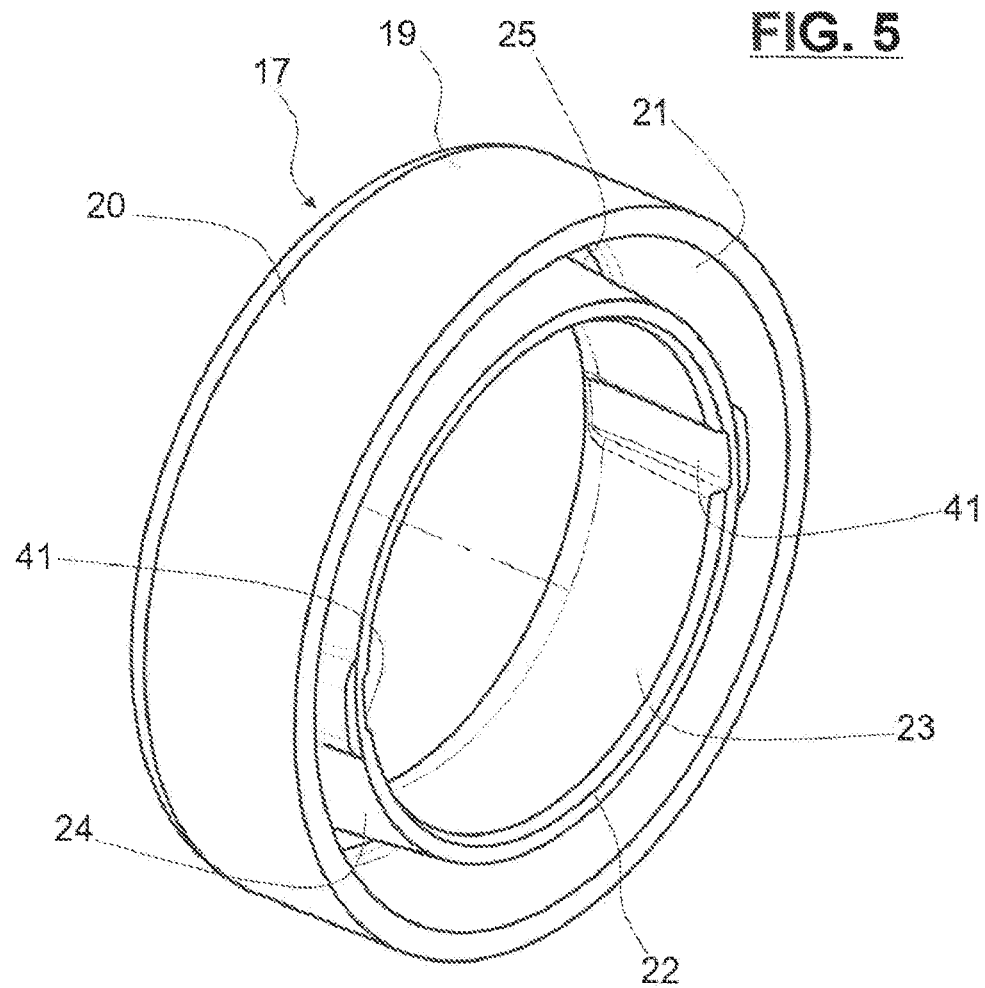

PULLEY DEVICE, IN PARTICULAR FOR TENSIONING IDLER OR RUNNER ROLLER

CROSS-REFERENCE

This application claims priority to German patent application no. 10 2019 202 140.9 filed on Feb. 18, 2019, the contents of which are fully incorporated herein by reference.

TECHNICAL FIELD

The present disclosure is directed to the field of pulley devices for tensioning idlers or runner rollers designed to interact with a chain or a belt, for example a distribution belt of an internal combustion engine of a vehicle.

BACKGROUND

Such rollers are usually used to keep a tension on the belt or chain constant or in a determined range or to locally modify the path taken by the chain or belt. These are called respectively tensioning idlers or runner rollers. In runner rollers, the pulley is mounted so as to rotate on a screw or a spindle by means of a rolling bearing, the roller then being attached directly or indirectly to the engine block or to an element of a tensioning idler device, for example an articulated arm or an eccentric.

Document GB 190509598 discloses a pulley comprising male and female overlapping parts which are in interlocking relation and form a cylindrical outer portion intended to be in contact with a belt.

A major disadvantage of this pulley is that an annular recess is formed on the outer portion adapted to support the belt when the male and female parts are fastened together. There is therefore a risk of an early wear of the belt.

It is also known by document GB 141 829 a pulley comprising a peripheral part intended to be in contact with a belt, an inner part and a intermediate part between the inner and outer parts. The pulley is tightened to the outer ring of bearing, but said pulley can slightly axially move during the service use of the pulley device. Moreover, with a pulley such as disclosed, the outer part may be deformed radially inwards by bending under the action of the belt.

It has been proposed in document DE 202005011230 U1 to house a damping element such as a damping ring within a C-shaped pulley, said damping element being configured to damp vibrations from the belt and being suitable to limit radial inward deformation of the outer portion of said pulley. However, the pulley can still be deformed under heavy loads.

SUMMARY

An aspect of the disclosure is to overcome these drawbacks by providing a pulley which is easy to install onto a bearing, of good rigidity, adapted to avoid an early wear of the belt, and permitting an efficient support of said belt.

To this end, the disclosure relates to a pulley device suitable for a belt of chain tensioning idler or runner roller, comprising a bearing and a pulley.

The bearing comprises a rotatable outer ring and a fixed inner ring, said rings being coaxial.

The pulley comprises at least one pulley part having in cross section an overall shape of a C, and having an inner portion with an inner surface force fitted (press-fitted) on an outer cylindrical surface of an outer ring of the bearing, an outer cylindrical portion having an outer cylindrical surface intended to be in contact with the belt or the chain, and a radial intermediate portion extending substantially radially between axial ends of inner and outer cylindrical portions on one axial side of the pulley device, the pulley part being formed integral and defining an open end on one axial side opposite to the intermediate portion.

According to the disclosure, the inner cylindrical portion of the pulley part comprises at least one axial groove open on both axial sides. The outer ring is provided with at least one material deformation on a radial lateral surface on the axial side of the intermediate portion of said pulley part, said material deformation radially protruding out of the outer cylindrical surface of the outer ring. Said material deformation is configured to pass through the axial groove when the pulley part is axially pushed onto the outer ring of the bearing, and configured to form an axial stop for the pulley part in one axial direction when the pulley part has been circumferentially turned with respect to the outer ring.

According to further aspects of the disclosure which are advantageous but not compulsory, such a pulley device may incorporate one or several of the following features:

- The bearing is a rolling bearing, at least one row of rolling elements being radially interposed between the inner ring and the outer ring.
- The rolling elements are balls.
- The rolling elements are equally circumferentially spaced and maintained by an annular cage.
- The pulley is formed by only one pulley part.
- The pulley comprises two C-shaped pulley parts mounted onto the outer cylindrical surface of the outer ring of bearing, open ends of said pulley parts axially facing each other, free ends of outer portions of the pulley parts being in axial abutment.
- The two pulley parts are symmetrical with respect to a transverse radial plane passing through the center of the bearing.
- Both radial lateral surfaces of the outer ring are each provided with at least one material deformation to form axial stops for intermediate portions of both pulley parts in both axial directions.
- The total length of the inner portions of the two C-shaped pulleys mounted onto the outer ring is at least equal to 90% of the axial length of the outer cylindrical surface of said outer ring.
- The outer portion of the pulley part is of greater axial length than that of the inner portion, said outer portion protruding axially on at least one axial side of the inner portion.
- The inner portion of the pulley part is cylindrical, with an inner cylindrical portion.
- The pulley part is made from a stamped metal sheet or blank.
- The material deformation is formed by axial crimping of the radial lateral surface towards the opposite axial side.
- The axial groove is formed by stamping of the inner cylindrical portion of the pulley part.
- The radial lateral surface comprises a plurality of material deformations, and the pulley part comprises a plurality of corresponding axial grooves.
- Material deformations and axial grooves are circumferentially equally spaced.

BRIEF DESCRIPTION OF THE DRAWINGS

The disclosure will now be explained in correspondence with the annexed figures, as illustrative examples, without restricting the invention. In the annexed figures:

FIG. 5 is a perspective view of a pulley part provided to the pulley device of FIG. 1.

DETAILED DESCRIPTION

Figure 1:
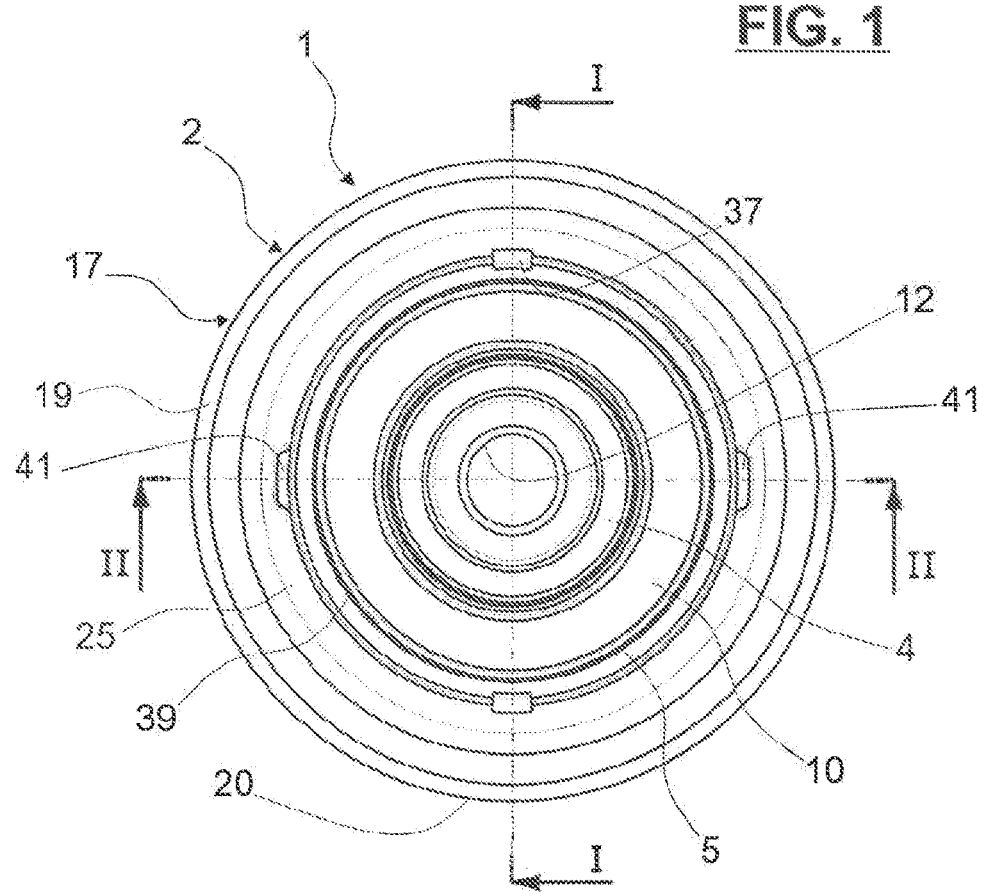
FIG. 1 is a side view of a pulley device according to an embodiment of the invention.
Figure 2:
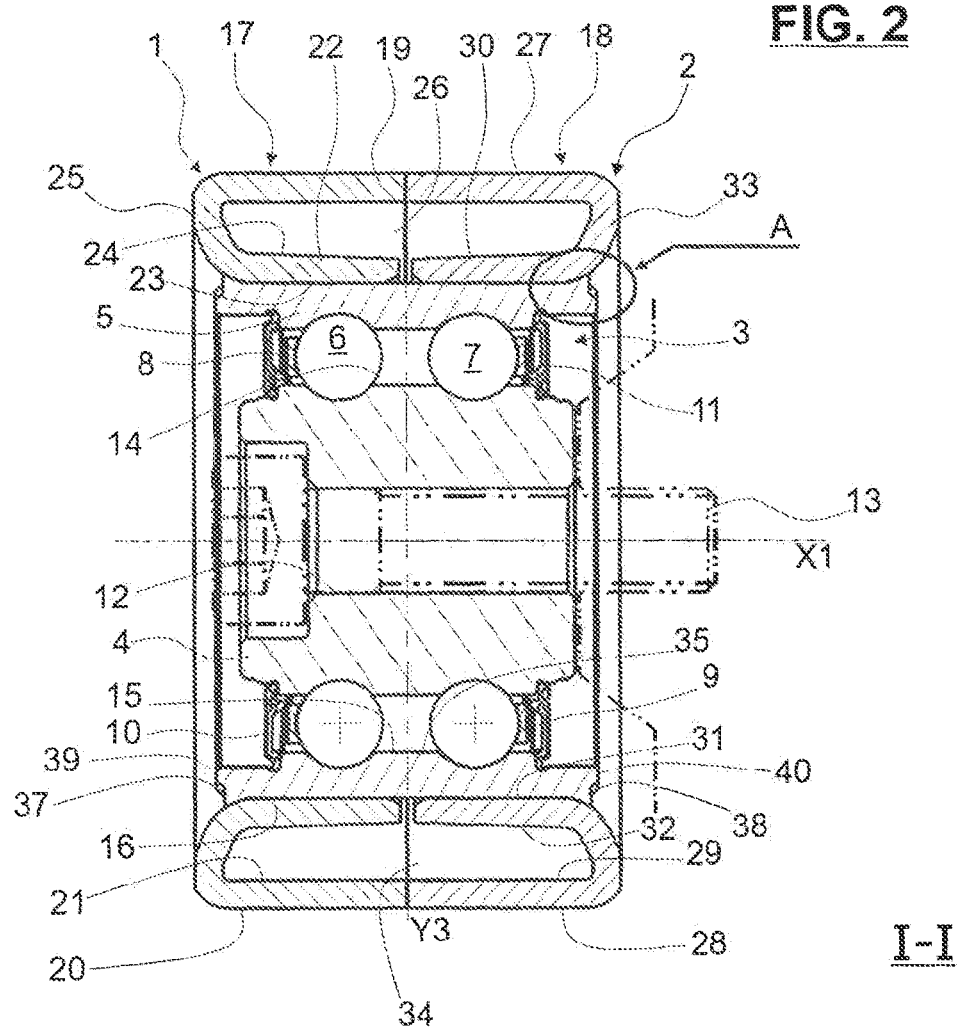
FIG. 2 is an axial section I-I of pulley device of FIG. 1.
Figure 3:
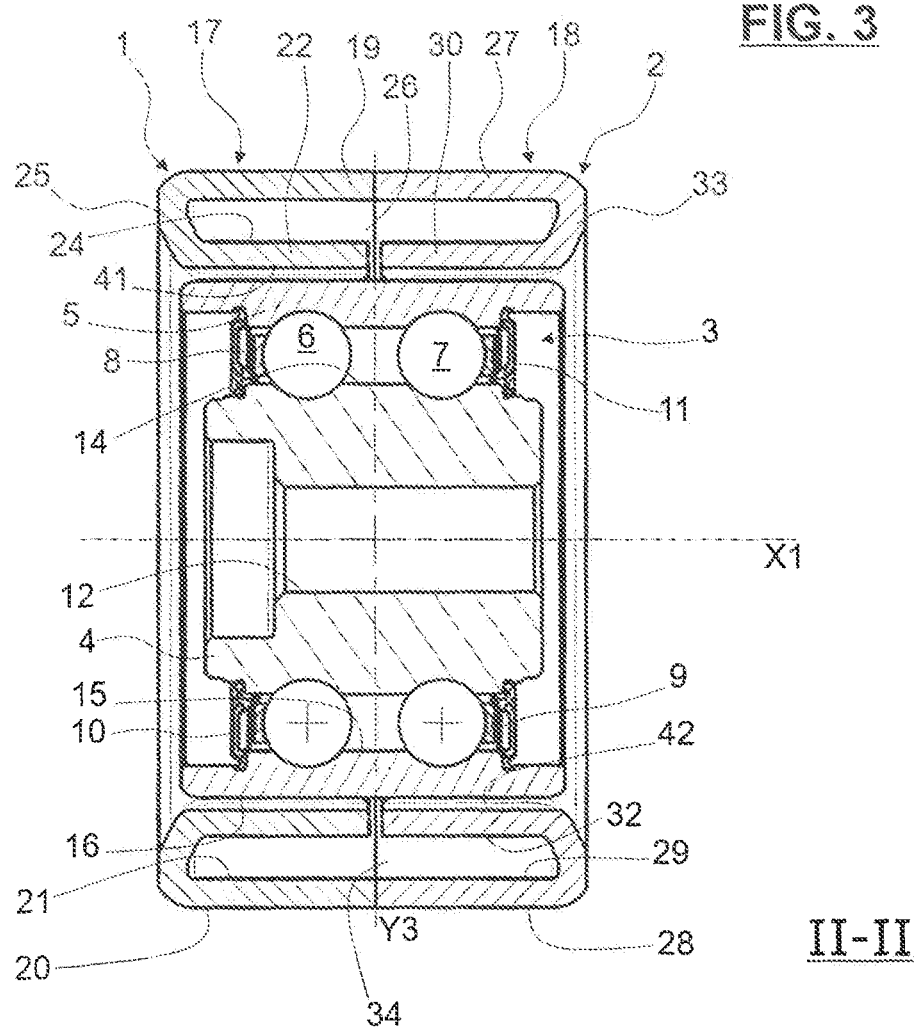
FIG. 3 is an axial section II-II of pulley device of FIG. 1.

The pulley device 1 as illustrated in FIGS. 1 to 5 is suitable for a belt or chain tensioning idler or runner roller, and comprises a pulley 2 adapted to interact with a belt or chain (not shown) and a rolling bearing 3 with a geometric axis X1.

The rolling bearing comprises a fixed inner ring 4 and a rotatable outer ring 5 between which are housed two rows of rolling elements 6 and 7, which in this case are balls, two annular cages 8, 9 respectively maintaining the circumferential spacing of said rolling elements 6, 7, and two annular seals 10, 11.

The inner ring 4 and the outer ring 5 are concentric and symmetric with respect to a transverse radial plane Y3 passing through the center of the rolling bearing 3. The rings 4, 5 are advantageously of solid type. A solid type is to be understood as a ring obtained by machining with removal of material, by machining, grinding, from a metal tube stock, bar stock, rough forgings and/or rolled blanks.

The inner ring 4 comprises a bore 12 configured to receive a fastening screw 13 (in dotted line) to fasten the device 1 on an external support. The inner ring further comprises an outer cylindrical surface 14 onto which toroidal circular raceways are formed, said raceways having in cross section a concave internal profile adapted to the rolling elements 6, 7.

The outer ring 5 comprises a cylindrical bore having a first portion 15 on which a first toroidal circular raceway is formed and a second portion 35 onto which a second toroidal circular raceway is formed, said raceways having in cross section a concave internal profile adapted to receive the rolling elements 6, 7. The outer ring 5 further comprises an outer cylindrical surface 16.

The pulley 2 has two pulley parts 17, 18, both having in cross section an overall shape of a C.

The first pulley part 17 comprises an axial annular outer portion 19 providing a cylindrical outer surface 20 designed to interact with a portion of the belt of the chain, and a cylindrical inner surface or bore 21.

The first pulley part 17 also comprises an axial annular inner portion 22 providing a cylindrical inner surface or bore 23 into which the outer cylindrical surface 16 of outer ring 5 of bearing 3 is mounted, and a cylindrical outer surface 24.

The outer portion 19 is of larger diameter than that of the inner portion 22, said outer portion 19 radially surrounding the inner portion 22. Advantageously, the outer portion 19 is of greater axial length than that of the inner portion 22, said outer portion 19 protruding axially on at least one axial side of the inner portion 22.

The first pulley part 17 further comprises an annular radial intermediate portion 25 extending substantially radially between axial ends of the inner and outer cylindrical portions 22, 19 on a first axial side of the pulley device 1.

The first pulley part 17 then has in cross section an overall shape of a C, defining an open end 26 on one axial side of the pulley device 1. The first pulley part 17 is formed integral.

The second pulley part 18 comprises an axial annular outer portion 27 providing a cylindrical outer surface 28 designed to interact with a portion the belt of the chain, and a cylindrical inner surface or bore 29.

The second pulley part 18 also comprises an axial annular inner portion 30 providing a cylindrical inner surface or bore 31 into which the outer cylindrical surface 16 of outer ring 5 of bearing 3 is mounted, and a cylindrical outer surface 32.

The outer portion 27 is of larger diameter than that of the inner portion 30, said outer portion 27 radially surrounding the inner portion 30. Advantageously, the outer portion 27 is of greater axial length than that of the inner portion 30, said outer portion 27 protruding axially on at least one axial side of the inner portion 30.

The second pulley part 18 further comprises an annular radial intermediate portion 33 extending substantially radially between axial ends of the inner and outer cylindrical portions 30, 27 on a second axial side of the pulley device 1, said second axial side being axially opposite to the first axial side.

The second pulley part 18 then has in cross section an overall shape of a C, defining an open end 34 on one axial side of the pulley device 1. The second pulley part 18 is formed integral.

Advantageously, the pulley parts 17, 18 are both made of thin metal sheet or blank by folding, cutting and stamping.

Advantageously, the two C-shaped pulley parts 17, 18 are symmetrical with each other with respect to the radial plane Y3. The free ends of outer portions 19, 27 of first and second pulley parts 17, 18 respectively come into contact in an axial direction, the open ends 26, 34 respectively being axially open to each other. The two outer cylindrical surfaces 20, 28 form a surface dedicated to interact with the belt or the chain. The pulley 2 formed by the two pulley parts 17, 18 arranged in axial contact with each other is suitable for guiding, supporting the belt of the chain in an efficient manner.

The outer cylindrical surface 16 of the outer ring 5 of the bearing 3 comprises a plurality of material deformations 37, 38. The material deformations 37 are provided to a first radial lateral surface 39 on a first axial side of said outer ring 5, and material deformations 38 are provided to a second radial lateral surface 40 on a second axial side, said surfaces 39, 40 being opposite with respect to the radial plane Y3. The material deformations 37, 38 are circumferentially spaced around the lateral surfaces 39, 40 of outer ring 5.

The material deformations 37, 38 are radially outwardly protruding towards the pulley parts 17, 18, respectively. The material deformations 37, 38 radially extend out of the cylindrical outer surface 16 of the outer ring 15. Advantageously, the protruding material deformations 37, 38 are each formed by axial crimping of the radial lateral surfaces 39, 40, respectively, towards the opposite axial side.

Figure 4:
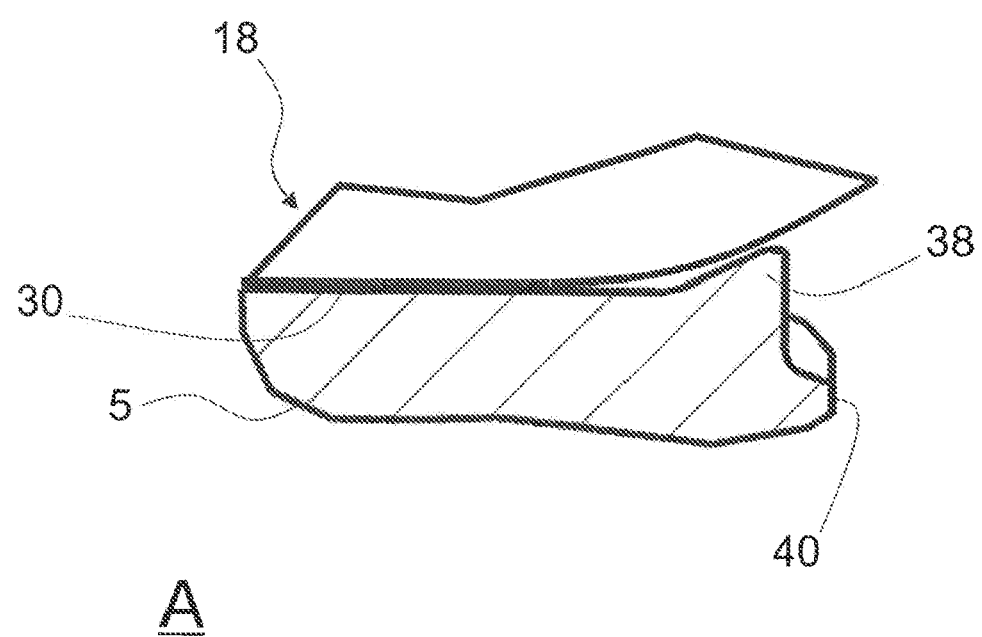
FIG. 4 is a detailed view A of the pulley device of FIG. 2.

As illustrated in FIG. 4, the protruding material deformations 38 come into abutment against the corner defined between the inner portion 30 and the intermediate portion 33 of second pulley part 18. The radial deformations 38 form axial stops for the pulley part 18 in a second axial direction. Symmetrically and similarly, the protruding material deformations 37 come into abutment against the corner defined between the inner portion 22 and the intermediate portion 25 of first pulley part 17. The radial deformations 37 form axial stops for the pulley part 17 in a first axial direction. The pulley 2 comprising the two pulley parts 17, 18 is axial abutment is then axially blocked in both axial directions with respect to the outer ring 5 of bearing 3. Even in case of heavy vibrations or shocks, the pulley 2 is prevented for axial movement and is suitable to efficiently support the belt of the chain for an increased and efficient service life.

According to the disclosure, the pulley part 17 further comprises two axial grooves 41, and the pulley part 18 further comprise two axial grooves 42.

The axial grooves 41 are provided on the inner cylindrical surface 23 of the inner cylindrical portion 22 of the first pulley part 17. The two grooves 41 are symmetric with respect to the axis X1. The axial grooves 41 extend axially between the both axial edges of the inner cylindrical portion 22, and are open on both axial sides.

The two diametrically opposite material deformations 37 are configured to be received by the axial grooves 41 of first pulley part 17 during the insertion of pulley part 17 onto the outer ring 5.

During the mounting of first pulley part 17 on outer ring 5, the material deformations 37 are aligned with the axially open axial grooves 41. Said pulley part 17 is then axially pushed onto the outer cylindrical surface 16 of outer ring 5. Material deformations 37 pass through the said axial grooves 41. When the material deformations 37 are out of their respective axial grooves 41, the pulley part 17 is circumferentially turned around the axis X1 with respect to the outer ring 5. The pulley part 17 is then in a final assembled position, and the material deformations 37 cooperate with an outer edge of inner cylindrical portion 22 so as to form axial stops in the axial direction opposite to the insertion direction of pulley part 17.

The inner cylindrical portion 22 is advantageously force fitted onto the outer cylindrical surface 16 of outer ring 5.

Similarly and symmetrically with respect to the radial place Y3, the axial grooves 42 are provided on the inner cylindrical surface 31 of the inner cylindrical portion 30 of the second pulley part 18. The two grooves 42 are symmetric with respect to the axis X1. The axial grooves 42 extend axially between the both axial edges of inner cylindrical portion 30, and are open on both axial sides.

The two diametrically opposite material deformations 38 are configured to be received by the axial grooves 42 of second pulley part 18 during the insertion of pulley part 18 onto the outer ring 5.

During the mounting of first pulley part 18 on outer ring 5, the material deformations 38 are aligned with the axially open axial grooves 42. Said pulley part 18 is then axially pushed onto the outer cylindrical surface 16 of outer ring 5. Material deformations 38 pass through the said axial grooves 42. When the free edge of outer cylindrical portion 27 of second pulley part 18 comes into abutment against the free edge of the outer cylindrical portion 19 of the first pulley part 17, the material deformations 38 are configured to be out of their respective axial grooves 42. The pulley part 18 is circumferentially turned around the axis X1 with respect to the outer ring 5. The pulley part 18 is then in a final assembled position, and the material deformations 38 cooperate with an outer edge of inner cylindrical portion 30 so as to form axial stops in the axial direction opposite to the insertion direction of pulley part 18.

The inner cylindrical portion 30 is advantageously force fitted onto the outer cylindrical surface 16 of outer ring 5.

In the illustrated embodiment, the material deformations 37, 38 and the axial grooves 41, 42 are symmetric with respect to the central radial plane Y3. Alternatively, the material deformations and the transverse (axial) grooves may be not symmetric. In the illustrated embodiment, the outer ring 5 comprises two material deformations 37, 38 on each lateral surface, and the pulley parts 17, 18 each comprise two corresponding axial grooves 41, 42. Alternatively, the outer ring may comprise only one pair of material deformations and axial groove on each outer ring lateral surface and the corresponding pulley part, or more than two. In the illustrated embodiment, the material deformations 37, 38 and the axial grooves 41, 42 are circumferentially equally spaced. Alternatively, the material deformations and the transverse grooves may be unevenly circumferentially spaced.

The axial grooves 41, 42 are advantageously formed by a stamping process.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved pulley device.

Moreover, various features of the above-described representative examples, as well as the various independent and dependent claims below, may be combined in ways that are not specifically and explicitly enumerated in order to provide additional useful embodiments of the present teachings.

What is claimed is:

1. A pulley device configured to support a belt of a chain tensioning idler or a runner roller, the pulley device comprising:
   a bearing having a rotatable outer ring having an outer cylindrical surface and a coaxial fixed inner ring, and
   a pulley having at least one C-shaped pulley part, the at least one pulley part having an inner cylindrical portion having an inner cylindrical surface press-fitted on the outer cylindrical surface of the outer ring and an outer cylindrical portion having an outer cylindrical surface configured to contact the belt, and a radial intermediate portion extending substantially radially between an axially outer end of the inner cylindrical portion and an axially outer end of the outer cylindrical portion, each of the at least one pulley part being formed integral and defining an open end on an axially inner side opposite the radial intermediate portion;
   the inner cylindrical portion of the at least one pulley part further including at least one axial groove extending from the axially outer end of the inner cylindrical portion to an axially inner end of the inner cylindrical portion; and
   the outer ring including at least one radially outwardly extending material deformation at a first axial end of the outer cylindrical surface of the outer ring,
   wherein the at least one pulley part is configured to be pushed onto the outer ring when the at least one axial groove is aligned with the at least one radially outwardly extending material deformation and then rotated relative to the outer ring so that the at least one groove is not aligned with the at least one radially outwardly extending material deformation and so that the at least one radially outwardly extending material deformation forms an axial stop to prevent the at least one pulley part from being axially removed from the outer ring.

2. The pulley device according to claim 1, wherein the at least one pulley part comprises no more than one pulley part.

3. The pulley device according to claim 1, wherein the at least one pulley part comprises two C-shaped pulley parts mounted onto the outer cylindrical surface of the outer ring of the bearing with the open ends of the two pulley parts axially facing each other, the axially inner ends of the inner cylindrical portions being in axial abutment and axially inner ends of the outer cylindrical portions being in axial abutment.

4. The pulley device according to claim 3, wherein the two pulley parts are symmetrical with respect to a transverse radial plane passing through a center of the bearing.

5. The pulley device according to claim 3, wherein the at least one material deformation comprises a first material deformation at the first axial end of the outer cylindrical surface of the outer ring and a second material deformation at a second axial end of the outer cylindrical surface of the outer ring.

6. The pulley device according claim 1, wherein the at least one radially outwardly extending material deformation is formed by axial crimping an end edge of the outer cylindrical surface of the outer ring.

7. The pulley device according claim 1, wherein the at least one axial groove is formed by stamping the inner cylindrical portion of the at least one pulley part.

8. The pulley device according to claim 1, wherein the at least one radially outwardly extending material deformation comprises a first set of material deformations at the first axial end of the cylindrical outer surface of the outer ring and a second set of material deformations at a second axial end of the cylindrical outer surface of the outer ring and, wherein said at least one axial groove comprises a plurality of axial grooves.

9. The pulley device according to claim 8, wherein the first set of material deformations are circumferentially equally spaced and the plurality of axial grooves are circumferentially equally spaced.

10. A method of assembling a pulley device configured to support a belt of a chain tensioning idler or a runner roller, the method comprising:

providing a bearing having a rotatable outer ring having an outer cylindrical surface and a coaxial fixed inner ring, and providing a pulley having at least one C-shaped pulley part, the at least one pulley part having an inner cylindrical portion having an inner cylindrical surface and an outer cylindrical portion having an outer cylindrical surface configured to contact the belt, and a radial intermediate portion extending substantially radially between an axially outer end of the inner cylindrical portion and an axially outer end of the outer cylindrical portion, each of the at least one pulley part being formed integral and defining an open end on an axially inner side opposite the radial intermediate portion, the inner cylindrical portion of the at least one pulley part further including at least one axial groove extending from the axially outer end of the inner cylindrical portion to an axially inner end of the inner cylindrical portion; and the outer ring including at least one radially outwardly extending material deformation at a first axial end of the outer cylindrical surface of the outer ring, aligning the at least one axial groove with the at least one radially outwardly extending material deformation, press fitting the at least one pulley part axially over the outer cylindrical surface of the outer ring such that the at least one radially outwardly extending material deformation traverses the at least one axial groove and emerges from the at least one axial groove, and rotating the at least one pulley part until the at least one radially outwardly extending material deformation is not circumferentially aligned with the at least one axial groove and such that the at least one radially outwardly extending material deformation forms an axial stop for the at least one pulley part in an axial direction.

\* \* \* \* \*